United States Patent [19]

Schilling

[11] 3,992,125

[45] Nov. 16, 1976

[54] UNDERWATER POWER APPARATUS WITH FURLABLE SAILS AS WORKING MEMBERS

[76] Inventor: Rolf E. Schilling, 318 Tiverton Lane, Steger, Ill. 60475

[22] Filed: July 10, 1974

[21] Appl. No.: 487,004

[52] U.S. Cl. .......................................... 415/5; 416/8
[51] Int. Cl.² .................... F03B 13/00; F03B 13/10
[58] Field of Search .............. 415/2, 4, 3, 5; 416/7, 416/8

[56] References Cited

UNITED STATES PATENTS

| 627,562 | 6/1899 | Wood | 416/8 |
|---|---|---|---|
| 641,668 | 1/1900 | Begas | 416/8 |
| 979,320 | 12/1910 | McKague et al. | 415/5 |
| 997,719 | 7/1911 | Tolleson et al. | 416/8 |
| 1,024,376 | 4/1912 | Struble | 416/8 |
| 1,071,544 | 8/1913 | Applegate | 415/5 |
| 1,332,178 | 2/1920 | Holden | 416/8 |

FOREIGN PATENTS OR APPLICATIONS

| 14,540 | | France | 416/8 |
|---|---|---|---|
| 506,818 | 12/1954 | Italy | 415/5 |

*Primary Examiner*—Carlton R. Croyle
*Assistant Examiner*—Thomas I. Ross
*Attorney, Agent, or Firm*—Gary, Juettner

[57] ABSTRACT

Underwater power apparatus for harnessing a flowing river or large stream, includes blades or sails moving within a housing and in a circuit on a power leg and return leg. The housing directs the stream flow onto the power leg to drive the apparatus and diverts the flow from the return leg to provide a quiescent area for the return leg. Preferably, the blades or sails are opened when on the power leg and are folded or closed when on the return leg to reduce resistance. The underwater power apparatus may have either arcuate or linear power and return legs. In the latter case, the legs can be of sufficient length to develop a high power output. Since the apparatus is disposed completely underwater it disrupts neither the scenic beauty nor the navigation of the river.

5 Claims, 7 Drawing Figures

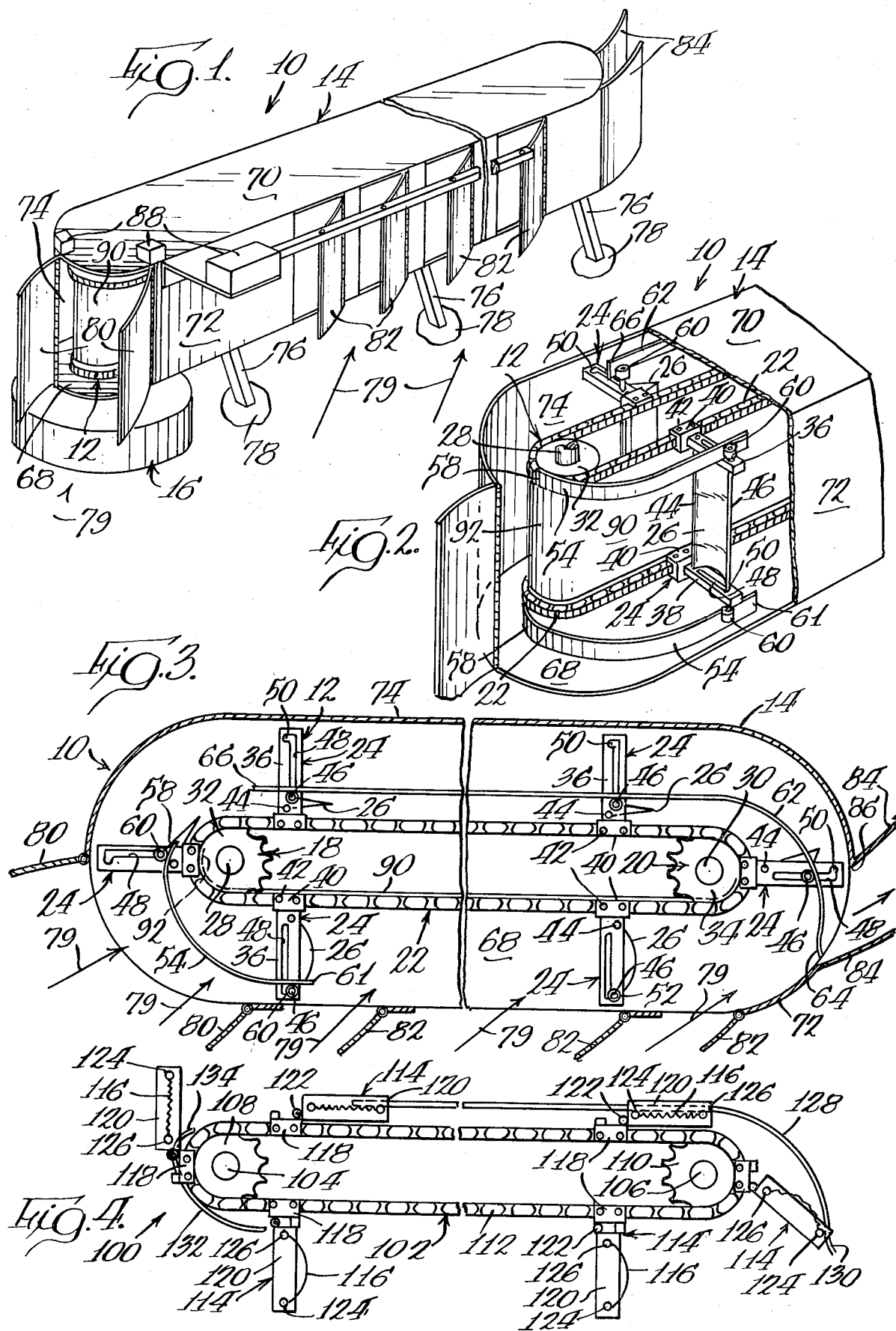

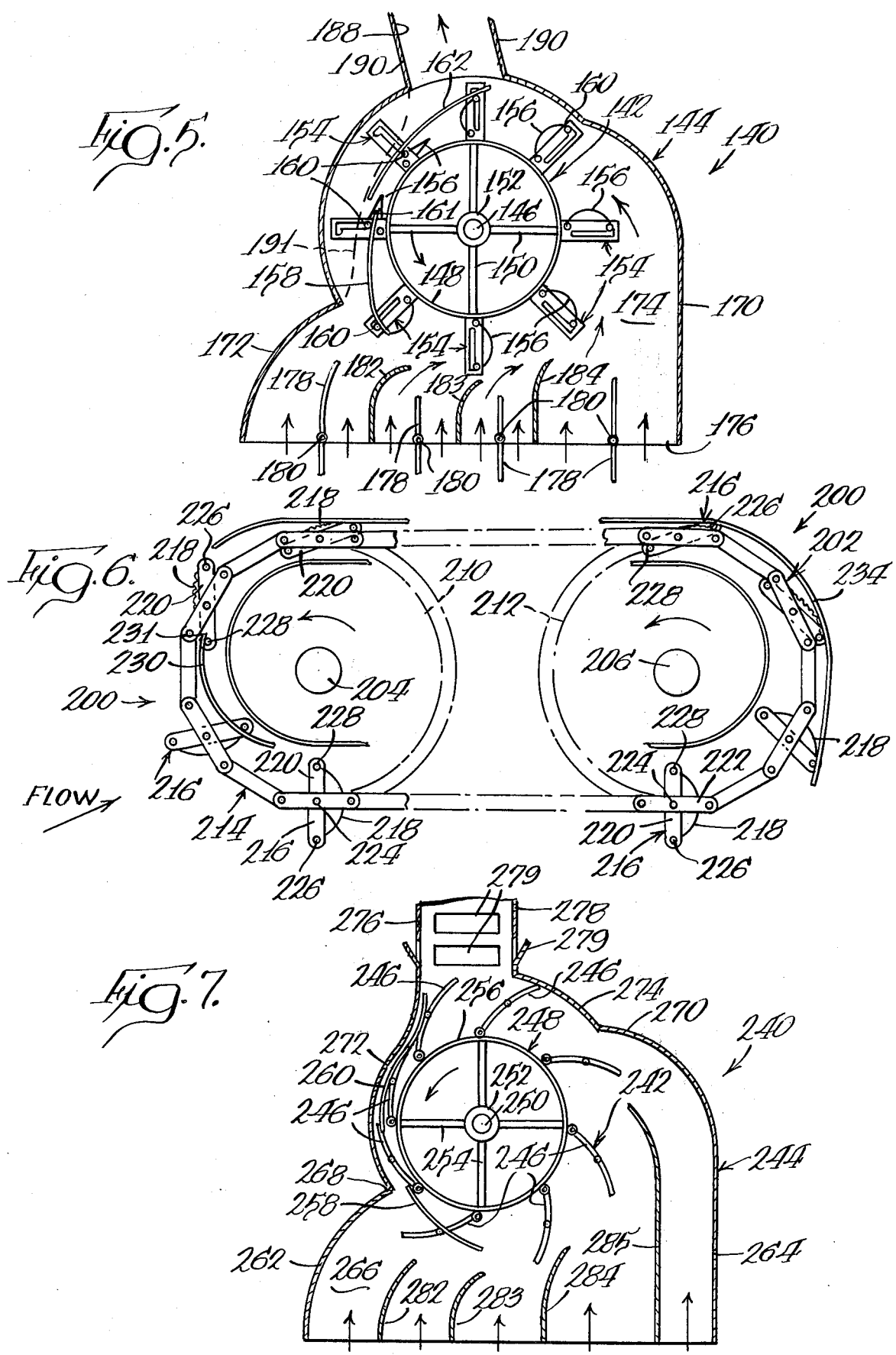

UNDERWATER POWER APPARATUS WITH FURLABLE SAILS AS WORKING MEMBERS

BRIEF DESCRIPTION OF THE PRIOR ART

Heretofore, various types of water wheels and turbines have been utilized to harness the power of flowing water, such as rivers or large streams. Usually these prior art devices were only partially submerged in the water and had portions exposed above the water. In addition, other auxiliary structures, such as chutes or dams, were frequently required to harness the water power.

Such prior art devices could and did disrupt the natural beauty of the river. With the growing concern for the preservation of the ecology and the natural beauty of our rivers, opposition to placement of such prior art devices stiffened, even in the face of an energy shortage. In addition, resistance to building new dams came from the marine interests, both commercial and recreational, since the dams interferred with navigation.

While various underwater power devices have been used in the past, such device developed relatively small amounts of power and were only suitable for such uses as powering oceanographic instruments on buoys at sea. Such prior art devices usually had small generators on which were mounted small propellers or paddles that drove the generators, the propellers or wheels being completely exposed to the random flow. Such devices had relatively low efficiencies since much of the flowing current by-passed the propellers or paddles.

BRIEF DESCRIPTION OF THE INVENTION

The disadvantages of the prior art devices have been overcome by the underwater power apparatus of the present invention, comprising blade or sail means for harnessing the power of the flowing stream or river and a housing for directing the flow over the blades or sails to increase the efficiency of the apparatus and the power developed. The sails or blades are carried through the housing and on a circuitous path or circuit having a power path or leg and a return path or leg. In addition to directing the flow into the power leg, the housing also diverts the flow from the return leg to provide for a quiescent passage of the sails back to the power leg. The underwater power apparatus of the present invention may have linear power and return legs connected together to form the circuit, or may have a circular circuit with the power and return legs on portions of the circular periphery. Preferably, the sail means are in the form of sails which can be opened or unfurled when in power leg and folded, closed or furled when in the return leg to increase power output and reduce resistance.

Further, since the power apparatus of the present invention is entirely underwater, it does not disrupt the natural scenic beauty of the river. Also, the underwater apparatus of the present invention can be located a sufficient depth below the surface of the water so as not to interfere with navigation.

THE DRAWINGS

FIG. 1 is a perspective view of a first embodiment of the invention;

FIG. 2 is a perspective view of the upstream end of the apparatus of FIG. 1, with portions of the housing broken away to reveal the internal structure;

FIG. 3 is a horizontal longitudinal section of the apparatus of FIGS. 1 and 2;

FIG. 4 is a fragmentary horizontal longitudinal section of a modified version of the apparatus of FIG. 3;

FIG. 5 is a horizontal longitudinal section of a second embodiment of the invention;

FIG. 6 is a view similar to FIG. 4 of a further modification of the apparatus of FIGS. 1 to 3; and FIG. 7 is a horizontal longitudinal section of a third embodiment of the apparatus of the invention.

DESCRIPTION OF THE PREFERRED EMBODIMENTS

In FIGS. 1–3 an underwater power apparatus 10 of the present invention is illustrated. The apparatus 10 is adapted to be located completely beneath the surface of a flowing river or large stream and harness the water flow to produce usable power. Thus, the apparatus 10 does not destroy the scenic beauty of the river, as would a conventional dam. The apparatus 10 can be located at sufficient depth so not to interfere with navigation, as would a dam. The apparatus 10 comprises blade or sail means 12 for harnessing the water flow of the stream and a housing 14 for containing the sail means and directing the water flow onto the sail means. While the harnessed mechanical power of the sail means 12 could be used directly, preferably, the sail means 12 drives an electric generator 16 to produce electricity usable elsewhere.

As shown in FIG. 3, sail means 12 of the apparatus 10 comprises, first rotating means 18 at the upstream end, second rotating 20 means at the downstream end, belt or chain means 22, or the like, connecting the first and second rotating means, and a plurality of mast means 24 on the chain means, each carrying a sail 26. The first and second rotating means 18 and 20 are similar to each other, and each has a shaft 28 or 30. While the shafts shown are vertical, it should be understood that horizontal shafts also could be employed. While it is possible to construct sail means 12 using a single sprocket on each of the shafts 28 and 30, preferably each of these shafts has a pair of vertically spaced sprockets for cooperating with compatible chain means 22 to connect the first and second rotating means. The shaft 28 has a pair of vertically spaced sprockets 32 secured thereto, and the shaft 30 has a similar pair of sprockets 34 secured thereto. The upper and lower ends of each of the shafts may be rotatably mounted in bearings (not shown) secured to the housing 14. At least one of the shafts 28 or 30 is an output shaft. In this instance, shaft 28 is adapted to drive the generator 16.

The sprockets and belt or chain means selected must be compatible with each other. While various types of belt or chain, such as V-belts or roller chain, could be used, in the present instance large link conveyor type chain and sprockets are used. As is shown in FIGS. 2 and 3, the chain means 22 is endless, that is its ends are connected together to form a closed loop of chain. One loop of chain engages the lower pair of sprockets 28 and 30, and another loop of chain engages the upper pair of sprockets 28 and 30 to rotatably connect the shafts 28 and 30 together.

Mast means 24 carrying sails 26 are provided to harness the stream flow. As is shown in FIGS. 2 and 3, a plurality of mast means 24 are located and secured to chain means 22 so that the mast means and sails 26 travel along with the chain. As is shown in FIG. 2, each mast means 24 has upper and lower horizontal body members 36 and 38, respectively. At the end adjacent the chain 22, each body member 36 and 38 has a bifurcated bracket portion 40 for securing the body to the chain. Each bracket portion 40 has upper and lower arms which extend over the links of the chain 22 and have openings therein. Extended length pins 42, connecting the links of the chain together, also extend through the openings in the bracket portions to secure the body members to the chain.

Preferably, the sail 26 is carried by the mast means 24 so that the sail can be held in an open or unfurled position, generally perpendicular to the direction of flow for a portion of its travel, i.e., in the power leg, and can be held in a second closed or furled position, generally parallel to the direction of flow for another position of its travel, i.e., in the return leg. The mast means 24 is constructed to provide such positioning of the sail and has a fixed vertical rod 44 carrying one end of the sail and a slidable vertical rod 46 carrying the other opposite end of the sail. The fixed rod 44 may fit in openings in the body members 36 and 38 and be secured thereto, such as by being welded or pinned. The ends of the fixed rod 44 need not extend beyond the body members 36 and 38.

The sliding rod 46 moves or slides in horizontally elongated slots 48 extending vertically through the body members 36 and 38. The slots 48, except for one of their ends are straight, the one end having a detent 50 formed therein on the downstream edge (with reference to the power leg). The sliding rod 46 may be held in vertical position with respect to the bodies 36 and 38 by various means, such as a pin 52 passing through an opening in the rod 46 and sliding on the upper surface of the body member 38. The rods 46 extend out beyond the ends of the body members 36 and 38 and, as will be described, are actuated to open and close the sail.

Each sail 26 is made of a generally rectangular piece of flexible material or cloth, such as rubberized nylon. The sail is secured to the associated rods 44 and 46, as by sewing the material on to itself to form loops at the vertical ends, the loops receiving the rods 44 and 46.

The apparatus 10 also includes means for unfurling or opening the sails during one portion of travel, i.e., on the downstream leg and means for furling or closing the sails during another portion of travel, i.e., on the return leg. While the means for opening the sails and means for closing the sails could take various forms, preferably, both means are of the cam actuate type.

As is shown in FIGS. 2 and 3, means for opening the sails is provided at the upstream end of the apparatus, and includes a pair of vertically spaced cam strips 54 which, for example, may be secured to the housing 14. Each cam strip 54 has a tip 58 for initiating the opening of the sails. The tip 58 is located adjacent the upstream end of the upstream sprocket 32 near the transition from the return leg to the power leg. From the tip 58 each cam strip 54 curves around and outwardly away from the sprocket and chain and extends into the linear portion of the power leg; the cam strip then terminates. The cam strip 54 cooperates with cam surfaces on the mast means 24, in this instance provided by cam rollers 60 rotatably mounted on the ends of the sliding rod 46. As masts means 24 moves counterclockwise about the shaft 28 and sprocket 32 toward the tip 58 of the cam strip, the sliding rod 46, or more particularly the rollers 60, on the ends thereof, are intercepted by the tips 58 of the cam strips 54. As the mast means 24 continues to turn about the shaft 28, the cam strip 54 forces the sliding rod from a position adjacent the fixed rod 46 to the outer end of the slot 48 to open the sail 26. After reaching the end of the slot 48, water pressure causes the rod 46 to be held in the detent 50 so that the cam strip 54 no longer is needed to hold the sail open and terminates at its end 61.

Means for closing the sails is provided at the downstream end of the apparatus, and includes a pair of vertically spaced cam strips 62 which, for example, may be secured to the housing 14. Each cam strip 62 has an end or tip 64 extending outwardly away from the sprocket 34 beyond the path of the rod 46 and then curves inwardly and around the sprocket 34. The cam strips 62 cooperate with cam surface on the mast means provided by the cam rollers 60. As the mast means 26 turns counterclockwise about the shaft 30 toward the ends 64 of the cam strips 62, the rollers 60 on the sliding rod 46 contact the cam strips 62. The pressure of the cam strips 62 against the rollers 60 forces the rod 46 out of the detents 50 of the slots 48, and as the mast means 24 further turns, the cam strips 62 force the sliding rod from the open position to the closed position adjacent the fixed rod 44 to close the sail 26. The cam strips 62 continue to curve around the sprockets and terminate at the ends 66, just short of the tips 58 of the cam strips 54, to hold the sails 26 closed while on the return leg.

The housing 14 contains the sail means 12, just described, and encloses the power leg (the lower portion of FIG. 3) and the quiescent return leg (the upper portion of FIG. 3). The housing 14 has a bottom wall 68, a top wall 70 and side walls 72 and 74 joined together. The bottom wall 70 has a suitable opening therein through which the shaft 28 extends to connect to the generator 16. The housing 14 is supported on a plurality of legs 76 extending from the bottom wall 70, and the legs are located in concrete footings 78 in the stream bed. The housing 14 is located in the stream bed so that longitudinally the housing is at a slight angle to the normal current flow of the stream, represented by the arrows 79. By offsetting the housing approximately ten to fifteen degrees, it is possible to expose the front and upstream wall 72 to the current flow.

The housing 14 has two large doors 80 at its upstream end for admitting water flow to the power leg. In addition a plurality of side doors 82 are provided along the upstream side wall 72. The doors 82 are of a size and width to admit as much flow into the power leg as possible while retaining sufficient structural strength in the housing. A pair of curved walls 84 are provided adjacent downstream opening 86 of the housing to permit flow of water from the power leg. The curvature of the walls 84 is such to turn the flow again parallel to the stream current so as to reduce the pressure losses.

The doors 80 and 82 can be provided with a power operated means 88 for opening and closing the same, for regulating the power produced or completely shutting down the apparatus. This feature also makes possible a constant power output, even from a stream that has a varying flow, as for example, due to the seasonal changes of flow. Of course, when the doors 80 and 82 are closed, no current flows through the housing.

A shield 90 is provided inside the housing to separate the power leg from the return leg so that the current flows mainly through the power leg, the return leg being relatively quiescent. The shield 90 has a forward end 92 which curves partially around the sprocket 32 slightly beyond the longitudinal axis of the apparatus and extends toward the return leg. The other end of the shield extends straightly downstream and curves partially around the sprocket 34, again terminating near the longitudinal axis of the apparatus. As shown in FIG. 2, the shield closed off as much of the vertical space between the bottom wall 70 and top wall 72 as possible. The shield 90 may be secured to other portions of the housing 14, such as the walls 70 and 72.

Of course, the apparatus 10 is made from materials having the desired corrosion resistance when exposed to water, such as stainless steel or high strength plastics. Also the apparatus 10 can be of any desired length, width or height. However, the height should not be so great as to interfere with navigation in the stream.

Preferably, the generator 16 is directly coupled to the shaft 28 and revolves slowly, direct coupling avoiding any gear reduction power losses. Since the generator 16 revolves slowly, it has a rather large diameter rotor and stator to increase the linear velocity of the rotor.

In operation, current is admitted through the doors 80 and 82 to flow through the power leg, the current being contained in the power leg by the shield 90. The water flow in the power leg acts on several sails 26 carried in the open position on the mast means 24 to drive the apparatus. After one mast means 24 reaches the tips 64 of the cam strips 62, its sail is folded or closed. In the closed position the sail 26 offers less resistance. The one mast means 24 then is carried by the chain means 22 up the quiescent return leg. After passing the tips 58 of the cam strips 54 the sail is opened. The excess power developed by the sails is used to drive the generator 16 coupled to the shaft 28.

A second embodiment of underwater power apparatus 100 is shown in FIG. 4. While not shown, it should be understood that apparatus 100 has a housing similar to the housing 14 of the apparatus 10. The apparatus 100 has sail means 102, in some respects similar to sail means 12 of the apparatus 10. Sail means 102 comprises a pair of shafts 104 and 106, having pairs of upper and lower sprockets 108 and 110 connected by two chains 112. The chains 112 carry a plurality of mast means 114, each having a sail 116.

Sail means 102 of apparatus 100 is different from sail means 12 of apparatus 10 in that the sails 116 do not fold into a closed position but instead a portion of mast means 114 fold to a closed position. Mast means 114 includes a pair of vertically spaced bodies 118 secured and carried by the chains 112. Each body 118 is in two pieces, having one portion secured to the chain 112 and another portion 120 pivotally connected, as by a hinge 122, to the one portion. The hinge 122 is located on the upstream, vertical edge of the portions (when on the power leg), so that water pressure holds the sail in the open position on the power leg and tends to cause the body to pivot to the closed position on the return leg. The pivotal portions 120 have a pair of fixed rods 124 and 126 to which the sail is attached. The ends of the rod 124 and 126 extend beyond the bodies to cooperate with means for opening and closing, or folding and unfolding, the sails or bodies.

Preferably cam means 128 is provided at the downstream end of apparatus 100 for moving the sail on the portion 120 from an open position, perpendicular to the current, to a closed or folded position, parallel to the current. Cam means 128 has a tip 130 which engages the end of the rod 124 and pivots the portion 120 to the parallel position shown in the upper portion of FIG. 4. Cam means 128 extends upstream in the return leg to hold the portion 120 and sail 116 in the parallel position. Another cam means 132 is provided to open the sail by pivoting the portion 120 from the parallel position to the perpendicular position. Cam means 130 has a tip 134 which intercepts the ends of the rod 126, and the cam means 130 is shaped to relatively pivot the portion 120 to the desired perpendicular position as the mast means turns counterclockwise around the sprocket 108. After the sail is opened to the flow, the cam means 130 terminates, and the pressure of the current on the sail 116 keeps the portion 120 in position until the tip 130 of the cam means 128 is reached.

A third embodiment of the underwater power apparatus 140 of the present invention is shown in FIG. 5, and comprises sail means 142 and a housing 144. The apparatus 140 is an adaptation of the apparatus 10 to a wheel form. However, unlike prior type water wheels, apparatus 140 has very nearly 75% of its periphery exposed to water flow and thus has a high efficiency.

Sail means 142 includes a shaft 146 adapted to be coupled to a suitable generator (not shown). The shaft may be mounted in bearings (not shown) secured to the housing 144. A tubular or cylindrical wall 148 has spokes 150 which join a center hub 152 fixed to rotate with the shaft 146, so that the cylindrical wall 148 rotates with the shaft. The cylindrical wall 148 functions in a manner similar to the chains 22 in that the wall has a plurality of mast means 154 secured thereto. The cylindrical wall also functions in a manner similar to the shield 90 in that the wall 148 forms a partition of the power leg.

Mast means 154 are rigidly secured to the wall 148 and extend radially from the wall. Mast means 154 in all other respects are similar to masts means 24 and have sails 156.

Means are provided to open and close or fold the sails 156 so that the sails are open during the power leg and closed during the return leg. Preferably, means for opening the sails comprises cam means including a cam strip 158 secured to the housing 144 and cooperating cam means, such as a roller on the end of sliding rod 160 of mast means 154. The end 161 of the strip cam 158 intercepts the rod 160 and change its position in a manner similar to that of the cam strip 54 of the apparatus 10, considering the shape of cam strip 158 is somewhat different. Preferably, means for closing or folding the sails comprises cam means, including a cam strip 162 secured to the housing 144 and the roller on the rod 160. The cam strip 162 can move the sliding rod 160 from the radially outer position to the radially inner position to close or fold the sail in a manner similar to the cam strip 62 of apparatus 10. Of course, the shape of cam strip 162 is somewhat different from that of strip 62.

The housing 144 comprises outer walls 170 and 172 which along with a top wall (not shown) and a bottom wall 174 enclose the apparatus. The housing 144 is arranged to direct water flow onto about 75% of the periphery of the wheel carrying the sails. To accomplish this the housing has a large width opening 176 at its upstream end. The opening 176 is approximately one and one half times the diameter of the wheel. The opening 176 may be closed off by a plurality of doors 178. Preferably the doors 178 are mounted on center shafts 180 and have about equal areas on each side of the shaft so as to be balanced during operation. Of course, the central shaft 180 may be ganged together for operation by a single control.

The housing 144 includes baffle means to channel the water from the opening 176 about the periphery of the wheel apparatus 140. Thus, unlike prior art wheels current flow is provided to approximately 75% or more of the periphery of the wheel. In this instance, the walls 170 and 172 and three internal baffles 182 to 184, inclusive, are provided. The water flowing in the channel between the wall 172 and baffle 182 is the first to meet the sail means 154 and cause it to rotate couterclockwise, while the water flowing in the respective channels between the other baffles further drives the sail means 154 on its path until the water flowing in the channel between the baffles 184 and wall 170 strikes the sail means. The walls 170 and 172 and baffles 182 to 184 are parallel to the flow at the entrance 176 and then turn to direct the flow tangentially to the center of the sails.

After driving the apparatus 140, the water exists through an outlet opening 188 formed at the downstream end of the housing 144. The walls, 170, 172 and 174 and the top wall may diverge somewhat, as indicated at 190, to increase the water flow from the housing 144, and, thus, increase the power output.

The operation of the apparatus 140 is similar to that of apparatus 10. The sails 156 are opened by the cam means 158 and acted upon by the current to turn the cylindrical wall 148 and shaft 146 counterclockwise until the sails are then folded by cam means 162. The sails in folded position are carried around back to the opening point. A solid sheet metal shield 191, indicated in dotted lines, may be located in the return leg to reduce the open area in that leg and close off as much space between the wall 172 and the sliding rod 160 of the sail means as is possible without interferring with the movement of the sail means.

A fourth embodiment of underwater power apparatus 200 of the present invention is shown in FIG. 6, and comprises sail means 202 and a housing (not shown) containing the sail means and directing the water flow therethrough. The housing for the apparatus 200 is generally similar to the housing 14 of apparatus 10. Sail means 202 includes a pair of rotating shafts 204 and 206 carrying sprockets 210 and 212 (shown in dashed lines). Of course, the shafts 204 and 206 are rotatably mounted in bearings (not shown) secured to the housing. One of the shafts is an output shaft which may be connected to a generator or the like. The sprockets 210 and 212 are joined together by large link type conveyor chain 214, the sprockets being compatible with such chain. The chain 214 carries a plurality of mast means 216 having sails 218 for driving the apparatus.

Each mast means 216 is considerably different from any previously described, and comprises a pivotal body 220 secured to one of the links of the chain 214, such as the link 222. The body 220 may pivot on a pin 224 engaging the link 222. A pair of fixed rods 226 and 228 are fixed to the body 220, and the sail is secured to and extends between the rods 226 and 228.

As is shown in the lower portion of FIG. 6, the sails 218 and bodies 220 may be pivoted to an open position, wherein the sails and bodies are generally perpendicular to the current flow of the stream of the power leg. As shown in the upper portion of FIG. 6, the sails and bodies may also be pivoted to a closed position, wherein the sails and bodies are generally parallel to their direction of travel to provide a minimum resistance to travel. Note however, that the link 222 and body 220 do not completely align, but the rods 226 and 228 are slightly offset, the rod 228 being inside the link 222 and the rod 226 being outside the link, relative to the shaft 204.

Again, means are provided to open and close the sails, and preferably cam means are used. Cam means for opening the sail comprises a cam strip 230 which is secured to the housing and cooperates with a cam surface on the body 220, such as a roller on the rod 228. The cam strip 230 has a tip 231 which intercepts the outside surface of the rod 228 and then pivots the body 220 and sail 218 to the open position. The cam strip then terminates. The balanced water pressure on the sail, assisted by a mechanism such as a spring loaded ball and detent on body 220 and link 222 if necessary, holds the sail in open position.

Cam means for closing the sails, i.e., moving them to the parallel position, comprises a cam strip 234 secured to the housing and cooperating with a cam surface on the body, such as a roller on the end of the rod 226. The cam strip 234 has a tip which intercepts the outside surface of the rod 226 and forces the body 220 toward the link 222. The cam strip continues around the chain 214 stopping just short of the tip 232 of cam strip 230 to hold the sail closed on the return leg.

The last embodiment of underwater power apparatus 240 of the present invention is illustrated in FIG. 7, and comprises sail or blade means 242 for harnessing the current of the flowing stream and a housing 244 containing blade means 242 and directing the flow onto the blade means.

Preferably, blade means 242 is in the form of a wheel and comprises a plurality of folding blades 246 secured to a rotating member 248 in turn rotating on a shaft 250. The shaft 250 is rotatably mounted, such as by bearings (not shown) secured to the housing 244. The rotating member 248 has an outer hub 252 fixed to and rotating with the shaft 250. A plurality of spokes 254 extend radially from the hub and at their outer ends are secured to a cylindrical wall 256. The cylindrical wall 256, in a manner similar to the wall 148 of apparatus 140, carries the blades 246 and cooperates with the housing 244 to channel the water flow. The blades 246 are rigid and have their inner ends pivotally secured to the cylindrical wall 256. The blades are movable to a radially outward position wherein they are held closely adjacent but spaced away from the outer wall, such being achieved by limiting the pivotal movement of the blade. The blades 246 are opened at the start of the power leg by cam means 258 engaging a portion of the blade, such as a roller at its mid point, and may be closed by cam means 260 engaging the same roller at the start of the return leg so that the blades have less resistance on the return leg than the driving force produced on the power leg.

The housing 244 is generally similar to the housing 144 of apparatus 140 previously described. The housing 244 directs and channels the flow to about 75% of the periphery of the wheel to increase the power output. The housing 244 includes outer side walls 262 and 264 which are closed by a bottom wall 266. At the front, the side walls 262 and 264 are spaced a distance apart approximately one and one half times that of the diameter of the wheel. The walls 262 and 264 extend from their open upstream end straight downstream a short distance and then gradually turn toward the wheel and are between radial and tangential just adjacent the wheel, as indicated at the numerals 268 and 270, respectively. The side walls then continue a short distance downstream following the periphery of the wheel, as indicated by the numerals 272 and 274. The side walls finally extend straight downstream, indicated by the numerals 276 and 278 and then terminate. At the rear the walls have exit slots 279.

The housing 244 includes baffle means between the side walls 262 and 264 for directing the waterflow in a somewhat tangential direction onto the upstream half of the wheel and a portion of the downstream half of the wheel. In the apparatus 240, four baffles 282 to 285, inclusive are shown. The baffles vary in arcuate curvature so as to guide the water generally tangentially onto the blades. Of course with blades of large width, i.e., the distance between the edge secured to the cylindrical wall and the opposite end of the blade, the baffles are arranged to direct the water generally tangentially onto the center of the blade and thus are positioned somewhat between tangential and radial.

Operation of the apparatus 240 is similar to that of the apparatus 140. Water flow forces the blades to revolve counterclockwise about the shaft 250. Power is produced on the power path from the point where the water strikes the unfurled or opened blades 246 on the power leg all along 75% of the periphery until the downstream end is reached. The wheel then carries the furled or folded blades along the 25% of the periphery comprising the return leg. The excess power is transmitted to the shaft 250 and may be used to drive a device such as an electric generator.

While only several embodiments of underwater power apparatus of the present invention have been shown and described, it should be understood that modification, variations and equivalent structure shall fall within the scope of the appended claims.

I claim:

1. An underwater power apparatus completely disposed beneath the surface of a flowing river or stream, comprising a driven device completely disposed beneath said surface, a plurality of sail means disposed and operating completely beneath said surface for harnessing the flow of the stream to drive said device, mast means for carrying each of said sail means, at least two rotatable shafts, one shaft being spaced downstream from the other shaft, endless loop means for carrying said mast means and sail means in a circuit about said shafts, one of said shafts driving said driven device, said circuit including a power path and a return path disposed the same depth beneath said surface as said power path, and housing means rotatably carrying said shafts and containing said sail means for directing the stream flow onto said sail means on said power path and diverting the stream flow from said sail means on said return path to provide quiescent water for said return path, an opening cam track in said housing at the upstream end for opening said sail means, a closing cam track in said housing at the downstream end for closing said sail means, at least one cooperating surface on each of said mast means for engaging said opening and closing cam tracks to open and close said sail means, said housing means having unobstructed upstream opening means for admitting flow substantially the entire length of said power path and an unobstructed downstream opening for exiting flow from said power path, said housing having a vertical upstream side wall containing said upstream opening means, an imperforate, vertical downstream side wall extending from said upstream side wall to said downstream opening and an imperforate, vertical interior shield within said housing separating said power and return paths to provide a volume of quiescent water for said return path, said upstream and downstream side walls and said imperforate interior shield extending substantially parallel to each other, said housing including substantially horizontal upper and lower walls connecting with said upstream and downstream side walls, and enclosing top and bottom portions of each of said power and return paths, whereby the flowing stream is efficiently utilized to drive said driven device.

2. An underwater power apparatus as in claim 1, wherein said mast means comprises at least one horizontally extending member secured at one end to said endless loop means, a fixed vertical rod secured at one end of said horizontal member and a vertical slidable rod, said horizontal member having a slot therein for receiving said slidable rod and a detent at the end of said slot spaced from said fixed rod for retaining said sliding rod in position, said sail means comprising flexible material secured to both of said rods, whereby said sail means may be furled and unfurled by said opening and closing cam track means engaging said slidable rod.

3. An underwater power apparatus as in Claim 1, wherein said rotatable shafts are perpendicular to the surface of the stream.

4. An underwater power apparatus for use in a stream of water having a current flow in a given direction, said apparatus comprising a pair of rotary members, one of said members being located upstream of the other, a flexible endless member carried by said rotary members in downstream and upstream directions of travel around in a loop, a plurality of sail means carried in a spaced relationship on said endless member, a housing surrounding said apparatus, an opening in said housing facing upstream for allowing current flow against said sail means in said downstream direction of travel, said housing and apparatus being entirely immersed in and filled with water, an imperforate shield means within said housing facing said opening therein and providing with said housing a quiescent volume of water around said sail means in the upstream direction of travel, and opening and closing means for opening said sail means at the beginning of the downstream direction of travel and closing said sail means at the beginning of the upstream direction of travel, said opening and closing means comprising a support mast connected between said sail means and said endless member and being movable to open and close said sail means, at least one bearing surface on each of said support masts, a cam track adjacent each of said rotary members, said bearing surfaces being slidably engageable with said cam tracks to open said sail means in the downstream direction of travel and to close said sail means in the upstream direction of travel.

5. An underwater power apparatus as in Claim 4, wherein said cam track adjacent the upstream end diverges away from said endless means to cause said sail means to open as it moves downstream, and said cam track adjacent the downstream end converges toward said endless means to cause said sail means to close as it moves upstream.

* * * * *